(12) United States Patent
Lee et al.

(10) Patent No.: US 11,910,295 B2
(45) Date of Patent: Feb. 20, 2024

(54) APPARATUS AND METHOD FOR CONTROLLING NETWORK SLICE DATA RATE IN WIRELESS COMMUNICATION SYSTEM

(71) Applicant: Samsung Electronics Co., Ltd., Suwon-si (KR)

(72) Inventors: Hoyeon Lee, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/140,590

(22) Filed: Jan. 4, 2021

(65) Prior Publication Data

US 2021/0211970 A1 Jul. 8, 2021

(30) Foreign Application Priority Data

Jan. 6, 2020 (KR) ........................ 10-2020-0001505

(51) Int. Cl.
*H04W 48/06* (2009.01)
*H04L 47/20* (2022.01)
*H04W 28/02* (2009.01)

(52) U.S. Cl.
CPC ............. *H04W 48/06* (2013.01); *H04L 47/20* (2013.01); *H04W 28/0268* (2013.01)

(58) Field of Classification Search
CPC . H04W 48/06; H04W 28/0268; H04W 24/08; H04W 48/18; H04W 76/12;
(Continued)

(56) References Cited

U.S. PATENT DOCUMENTS

2018/0220276 A1  8/2018  Senarath et al.
2018/0262924 A1  9/2018  Dao et al.
(Continued)

FOREIGN PATENT DOCUMENTS

KR  10-2021-0059468 A  5/2021
WO     2013/000516 A1  1/2013
(Continued)

OTHER PUBLICATIONS

3rd Generation Partnership Project; Technical Specification Group Services and System Aspects; Policy and charging control framework for the 5G System (5GS); Stage 2 (Release 16), 3GPP TS 23.503 V16.3.0, Dec. 22, 2019 sections 4.2.3, 5.3.11, 6.1.3.6; and table 6.2-2.
(Continued)

*Primary Examiner* — Peter P Chau
(74) *Attorney, Agent, or Firm* — Jefferson IP Law, LLP

(57) ABSTRACT

The disclosure relates to a 5$^{th}$ generation (5G) or pre-5G communication system for supporting a higher data rate after a 4$^{th}$ generation (4G) communication system such as long term evolution (LTE). According to various embodiments, a method for operating a network node in a wireless communication system is provided. The method comprises obtaining slice policy information including a maximum data rate, monitoring a data rate of protocol data unit (PDU) sessions associated with the slice, determining whether a sum of data rates of PDU sessions associated with the slice exceeds the maximum data rate, transmitting, to a second network node, a policy enforcement request message for controlling the sum of data rates of the PDU sessions associated with the slice.

12 Claims, 8 Drawing Sheets

(58) Field of Classification Search
CPC ..... H04W 76/18; H04W 28/22; H04W 24/02; H04W 24/10; H04W 36/0033; H04W 36/32; H04L 47/20
See application file for complete search history.

(56) References Cited

U.S. PATENT DOCUMENTS

| | | | | |
|---|---|---|---|---|
| 2021/0368383 | A1* | 11/2021 | Jangid | H04W 28/0289 |
| 2021/0377814 | A1* | 12/2021 | Sillanpaa | H04W 72/04 |

FOREIGN PATENT DOCUMENTS

| | | |
|---|---|---|
| WO | 2019/074347 A1 | 4/2019 |
| WO | 2019/194954 A1 | 10/2019 |

OTHER PUBLICATIONS

3rd Generation Partnership Project; Technical Specification Group Radio Access Network; NG-RAN; NG Application Protocol (NGAP) (Release 15), 3GPP TS 38.413 V15.5.0, Oct. 2, 2019 section 8.2.1.2.
Samsung, Solution for KI#3 limitation of data rate per network slice, SA WG2 Meeting #136, S2-1911620, Nov. 8, 2019, Reno, USA.
International Search Report dated Apr. 19, 2021, issued in International Application No. PCT/KR2021/000025.
European Search Report dated Jun. 7, 2021, issued in European Application No. 20217761.4.
Huawei et al., "Solution on limitation of data rate per Network Slice in UL and DL per UE," SA WG2 Meeting #136, S2-1911558, Reno, NV, USA, Nov. 18-22, 2019, retrieved on Nov. 8, 2019.
Samsung, "Solution for KI#3 limitation of data rate per network slice," SA WG2 Meeting #136, S2-1911620, Reno, NV, USA, Nov. 18-22, 2019, retrieved on Nov. 8, 2019.
European Search Report dated Oct. 10, 2023, issued in European Application No. EP23192611.4.

* cited by examiner

APPARATUS AND METHOD FOR CONTROLLING NETWORK SLICE DATA RATE IN WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0001505, filed on Jan. 6, 2020, in the Korean Intellectual Property Office, the disclosure of which is incorporated by reference herein in its entirety.

BACKGROUND

1. Field

The disclosure relates to a wireless communication system. More particularly, the disclosure relates to an apparatus and a method for controlling a network slice data rate in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a "Beyond 4G Network" or a "Post long term evolution (LTE) System".

The 5G communication system is considered to be implemented in higher frequency (millimeter (mm) Wave) bands, e.g., 60 gigahertz (GHz) bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

For the 5G system, studies are being conducted to support a wider variety of services than the existing 4G system. For example, the most representative services of the 5G system include an enhanced mobile broadband (eMBB) service, an ultra-reliable and low latency communication (URLLC) service, a massive machine type communication (mMTC) service, an evolved multimedia broadcast/multicast service (eMBMS), and the like.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for controlling a network slice data rate in a wireless communication system.

Additional aspects will be set forth in part in the description which follows and, in part, will be apparent from the description, or may be learned by practice of the presented embodiments.

In accordance with an aspect of the disclosure, a method of operating a network node in a wireless communication system is provided. The method comprises obtaining slice policy information including a maximum data rate, monitoring a data rate of protocol data unit (PDU) sessions associated with the slice, determining whether a sum of data rates of PDU sessions associated with the slice exceeds the maximum data rate, transmitting, to a second network node, a policy enforcement request message for controlling the sum of data rates of the PDU sessions associated with the slice.

In accordance with another aspect of the disclosure, a network node in a wireless communication system is provided. The network node includes at least one transceiver, and at least one processor. The at least one processor is configured to obtain slice policy information including a maximum data rate, monitor a data rate of protocol data unit (PDU) sessions associated with the slice, determine whether a sum of data rates of PDU sessions associated with the slice exceeds the maximum data rate, transmit, to a second network node, a policy enforcement request message for controlling the sum of data rates of the PDU sessions associated with the slice.

An apparatus and a method according to various embodiments may advantageously provide an apparatus and a method for controlling a network slice data rate in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Figure 4:
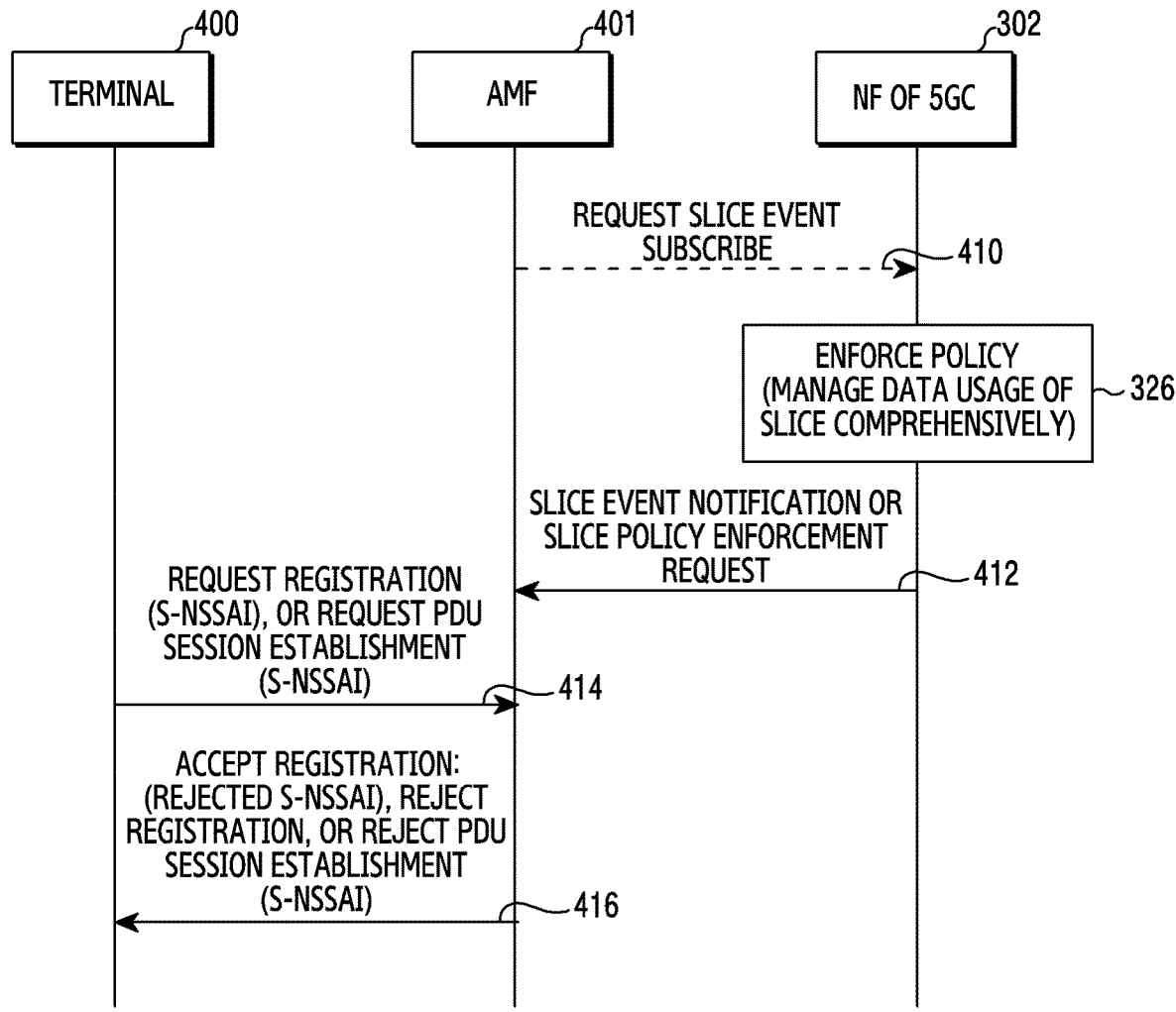
Figure 5:
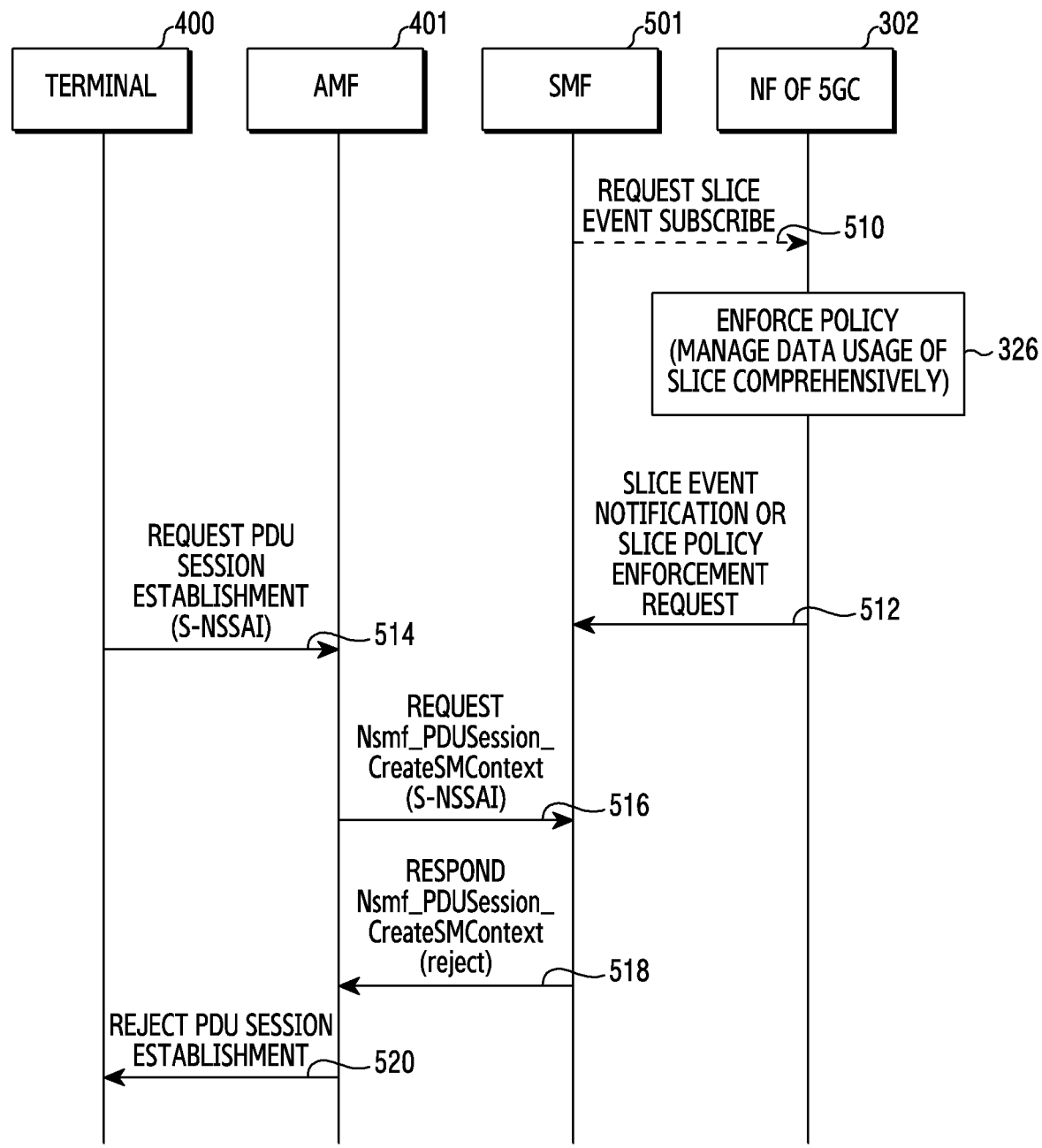
Figure 6:
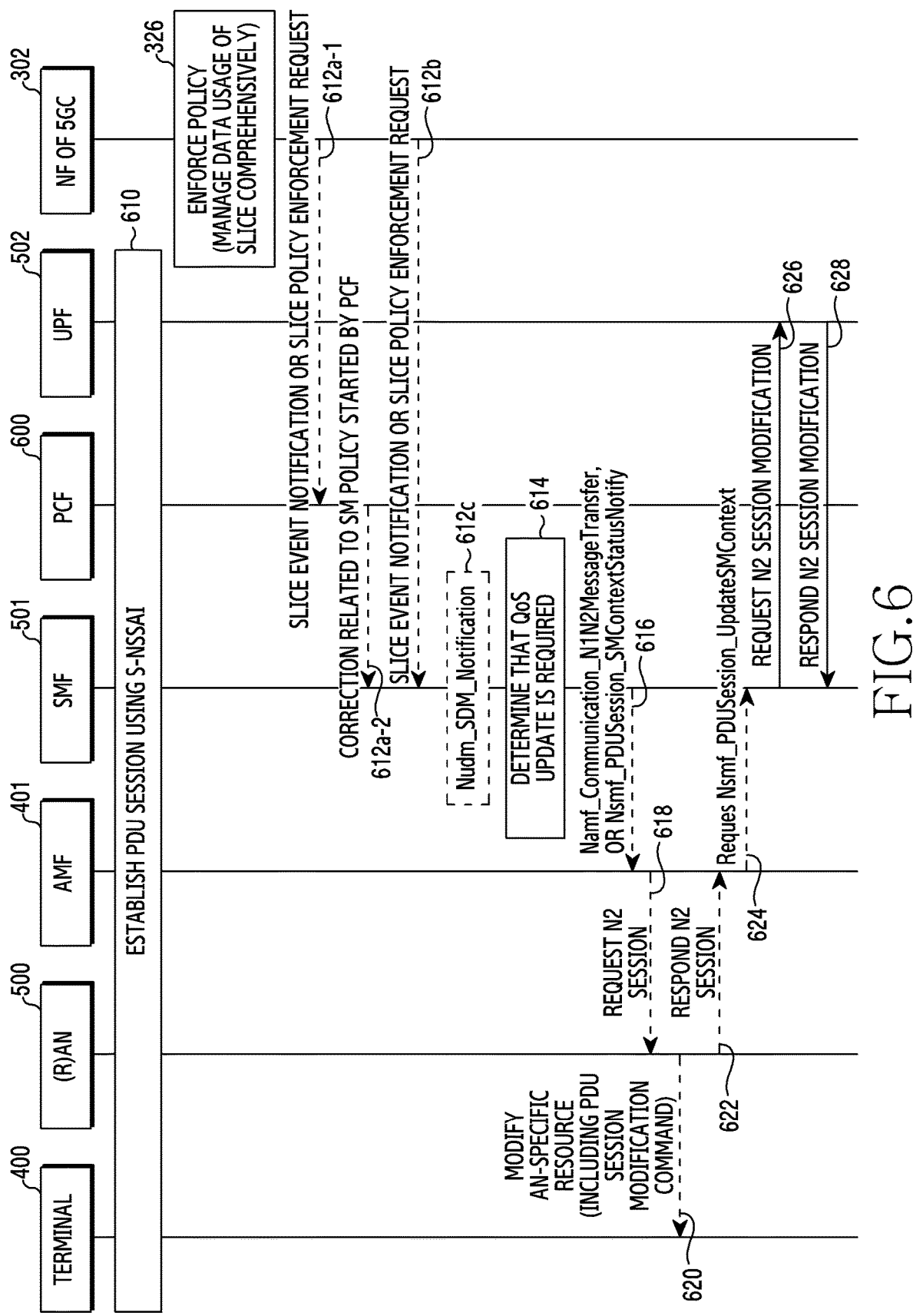
Figure 7:
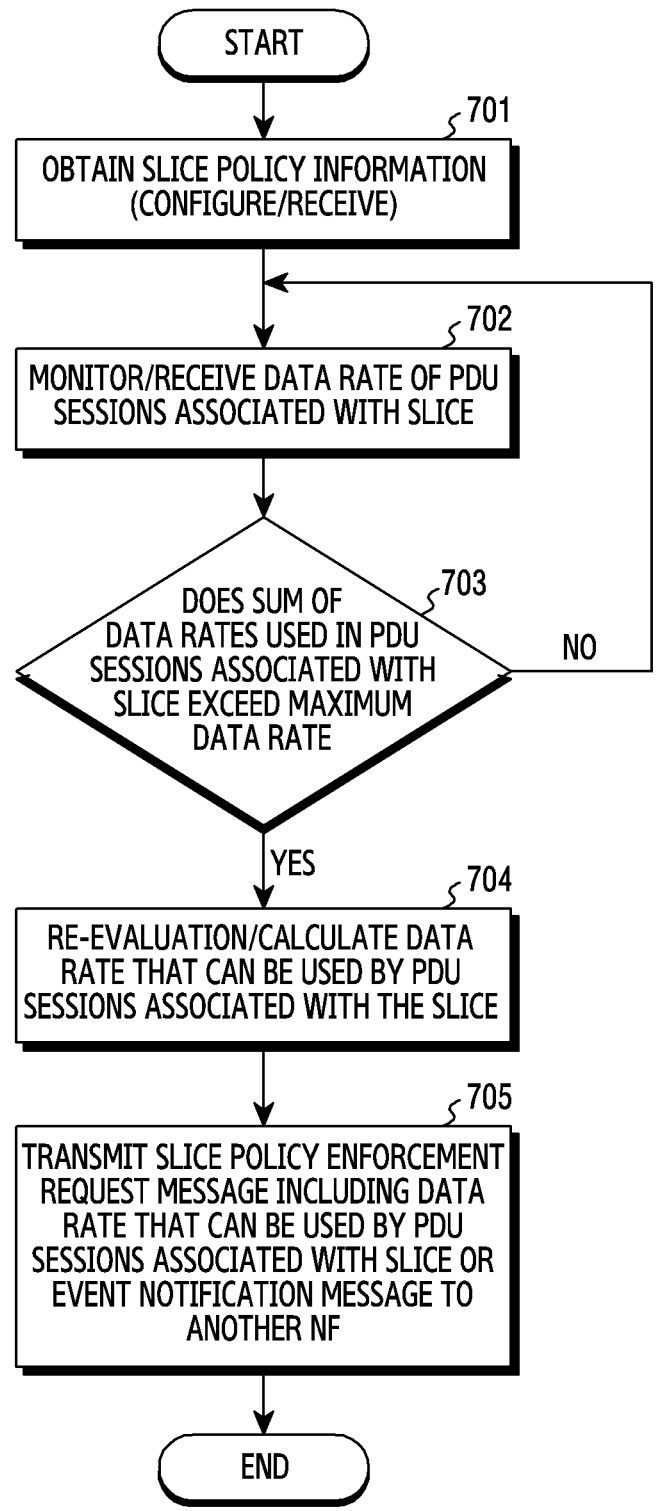

in a wireless communication system according to an embodiment of the disclosure;

FIG. 4 is a diagram illustrating a registration procedure or a protocol data unit (PDU) session establishment procedure in a wireless communication system according to an embodiment of the disclosure;

FIG. 5 is a diagram illustrating a PDU session establishment procedure in a wireless communication system according to an embodiment of the disclosure;

FIG. 6 is a diagram illustrating a PDU session modification procedure in a wireless communication system according to an embodiment of the disclosure; and FIG. 7 is a flowchart illustrating an operation process of an NF in a wireless communication system according to an embodiment of the disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

In the following description, terms referring to signals, terms referring to channels, terms referring to control information, terms referring to network entities, terms referring to device elements, and the like are illustratively used for the sake of convenience. Therefore, the disclosure is not limited by the terms as used below, and other terms referring to subjects having equivalent technical meanings may be used.

In the following description, terms for identifying access nodes, terms referring to network entities or network functions (NFs), terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the $3^{rd}$ generation partnership project long term evolution (3GPP LTE) and 5G standards for the convenience of description. However, the disclosure is not limited by these terms and names, and may be applied in the same way to systems that conform other standards.

Hereinafter, for convenience of explanation, the name of NF (e.g., access and mobility management function (AMF), session management function (SMF), network slice selection function (NSSF), or the like) is used as a target for exchanging information for access control and state management. However, embodiments of the disclosure can be applied equally even when NF is actually implemented as an instance (AMF instance, SMF instance, NSSF instance, or the like).

Figure 1A:
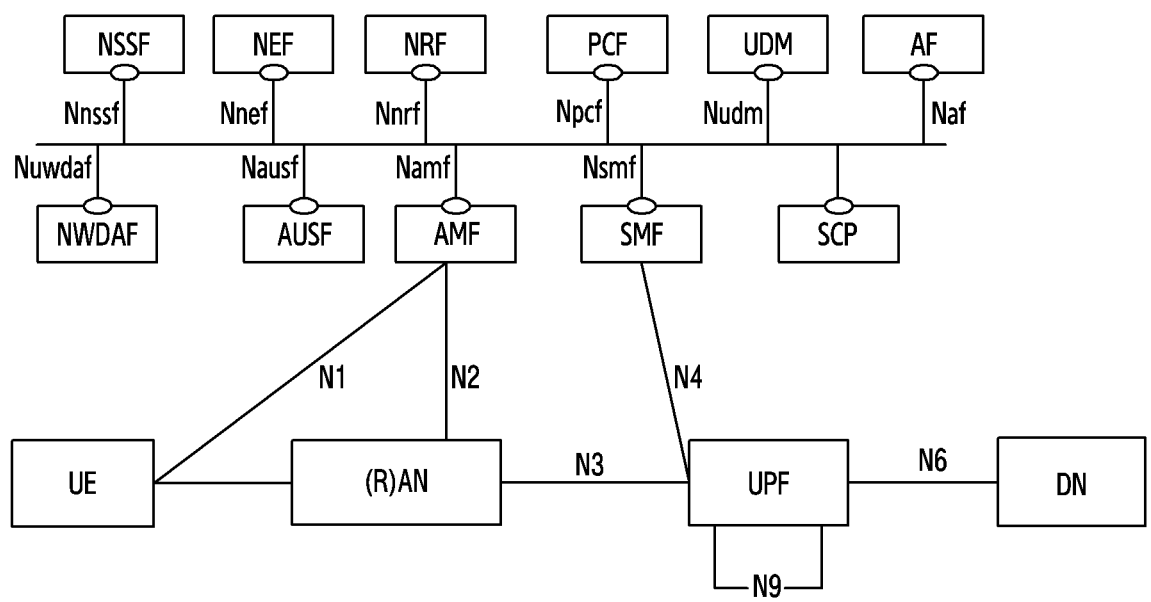
FIG. 1A is a diagram illustrating a structure of a wireless communication system according to an embodiment of the disclosure.

FIG. 1A is a diagram illustrating a structure of a wireless communication system according to an embodiment of the disclosure.

Referring to FIG. 1A, it illustrates an architecture of a $5^{th}$ generation system (5GS).

The 5G system (5GS) includes a terminal (user equipment (UE)), a base station ((radio) access network ((R)AN), and a 5G core network (5GC). The 5G core network may include an access and mobility management function (AMF), session management function (SMF), user plane function (UPF), policy control function (PCF), user data management (UDM), network slice selection function (NSSF), network data analytics function (NWDAF), or the like.

FIG. 1A illustrates only one terminal, one base station, and one NF of a 5G core network, but the terminal, base station, and other nodes identical or similar to the NF of the 5G core network may be further included.

The base station is a network infrastructure providing radio access to a terminal. The base station has a coverage defined as a certain geographic area based on a distance at which signals can be transmitted. The base station may be referred to as an "access point (AP)", an "eNodeB (eNB)", a "5G node ($5^{th}$ generation node)", a "gNodeB (gNB)", a "wireless point", a "transmission/reception point (TRP)", or other terms having an equivalent technical meaning in addition to base station.

The terminal is a device used by a user and communicates with a base station through a radio channel. In some cases, the terminal can be operated without user involvement. In this case, the terminal is a device that performs machine type communication (MTC) and may not be carried by a user. The terminal may be referred to as a "user equipment (UE)", a "mobile station", a "subscriber station", a "remote terminal", a "wireless terminal", a "user device", or another term having an equivalent technical meaning in addition to terminal.

The terminal may access the 5G core network through the base station. The terminal may be connected to the AMF and N2 interface through the base station, and may be connected to the UPF and N3 interface.

The access and mobility management function (AMF) is a network function (NF) that manages wireless network access and mobility for a terminal (UE).

The session management function (SMF) is an NF that manages a session for a terminal, and the session information includes quality of service (QoS) information, billing information, and packet processing information. The connection between the terminal and the SMF may be a packet data unit (PDU) session.

The user plane function (UPF) is an NF that processes user plane traffic and is controlled by the SMF. The UPF may be a gateway through which packets transmitted and received by the terminal are transmitted or a network entity that functions as a gateway. The UPF may be connected to a data network (DN) connected to the Internet, and may provide a path for transmitting and receiving data between the terminal and the DN. Accordingly, the UPF may route data to be transmitted through the Internet among packets transmitted by the terminal through the Internet data network.

The policy control function (PCF) is an NF that manages operator policy for providing services in a wireless communication system.

The user data management (UDM) is an NF that stores and manages UE subscription information.

The unified data repository (UDR) is an NF that stores and manages data. The UDR may store terminal subscription information and provide terminal subscription information to UDM. In addition, the UDR may store operator policy information and provide operator policy information to the PCF.

The network data analytics function (NWDAF) is an NF that provides analysis information for the operation of 5G systems. The NWDAF may collect data from other NFs or operations, administration and maintenance (OAMs) constituting the 5G system, analyze the collected data, and provide analysis results to other NFs.

The network slice selection function (NSSF) is an NF that performs an operation of selecting a network slice.

The authentication server function (AUSF) is an NF that provides a service for subscriber authentication processing.

The network exposure function (NEF) is an NF that can access the terminal management information in the 5G network and transmit subscription to the mobility management event of the corresponding terminal, subscription to the session management event of the corresponding terminal, request for session-related information, configuration of the charging information of the corresponding terminal, PDU session policy for the corresponding terminal change request, and small data on the corresponding terminal.

The network repository function (NRF) is an NF that stores state information of NFs and has a function of processing requests to find NFs that other NFs can access.

The application function (AF) is an NF having a function of providing services to users by interworking with a mobile communication network.

The service communication proxy (SCP) is an NF that provides functions, such as NF discovery for communication between NFs and message transfer between NFs. The SCP can operate in an integrated form with the NRF depending on the operator's choice, and in this case, the SCP can include the function of the NRF, or conversely, the NRF can include the function of the SCP.

In a 3GPP system, a conceptual link connecting NFs in the 5G system is defined as a reference point. The following exemplifies reference points included in the 5G system architecture represented in FIG. 1A.

N1: Reference point between UE and AMF
N2: Reference point between (R)AN and AMF
N3: Reference point between (R)AN and UPF
N4: Reference point between SMF and UPF
N5: Reference point between PCF and AF
N6: Reference point between UPF and DN
N7: Reference point between SMF and PCF
N8: Reference point between UDM and AMF
N9: Reference point between two core UPFs
N10: Reference point between UDM and SMF
N11: Reference point between AMF and SMF
N12: Reference point between AMF and AUSF
N13: Reference point between UDM and authentication server function (AUSF)
N14: Reference point between two AMFs
N15: Reference point between PCF and AMF in the case of a non-roaming scenario, and a reference point between the PCF and AMF in a visited network in the case of a roaming scenario Hereinafter, for the convenience of description, targets for exchanging information for access control and state management will be collectively described as NF. However, various embodiments of the disclosure may be equally applied even when NF is actually implemented as an instance (an AMF instance, an SMF instance, an NSSF instance, or the like).

In various embodiments of the disclosure, the instance may have a specific NF in the form of a software code, and may mean a state in which physical or/and logical resources are allocated from a computing system and executable in order to perform the function of NF in a physical computing system, for example, a specific computing system existing on the core network. Therefore, the AMF instance, the SMF instance, and the NSSF instance may mean that physical or/and logical resources are allocated and used for AMF, SMF, and NSSF operations from a specific computing system existing on the core network, respectively. As a result, when physical AMF, SMF, NSSF devices exist, and AMF instances, SMF instances, which are allocated and used physical or/and logical resources for AMF, SMF, NSSF operation from a specific computing system existing on the network, NSSF instances can perform the same operation. Therefore, in various embodiments of the disclosure, matters described as NF (AMF, SMF, UPF, NSSF, NRF, SCP, or the like) may be replaced with NF instances, or conversely, matters described as NF instances may be replaced with NF. Similarly, in various embodiments of the disclosure, a matter described as a network slice may be replaced with a network slice instance, or conversely, a matter described as a network slice instance may be replaced with a network slice.

According to various embodiments of the disclosure, in a 5G system defined by 3GPP, one network slice may be referred to as single-network slice selection assistance information (S-NSSAI). The S-NSSAI may include a slice/service type (SST) value and a slice differentiator (SD) value. The SST may represent the characteristics of services supported by the slice (e.g., enhanced mobile broadband (eMBB), Internet of things (IoT), ultra-reliable low-latency communication (URLLC)), vehicle-to-everything (V2X), or the like). The SD may be a value used as an additional identifier for a specific service referred to as SST.

The NSSAI may include one or more S-NSSAI. Examples of NSSAI include configured NSSAI (configured NSSAI) stored in the terminal, NSSAI (NSSAI) requested from the terminal, NSSAI (allowed NSSAI) permitted to be used by the terminal determined by the NF of the 5G core network (e.g., AMF, NSSF, or the like), and a subscribed NSSAI (NSSAI) to which the terminal is subscribed, and is not limited to the above example.

Meanwhile, in various embodiments of the disclosure, a data rate may be applied to downlink or uplink. If separate values are applied for uplink/downlink links, signaling may be separately transmitted (e.g., network slice aggregated maximum bit rate for downlink, or network slice aggregated maximum bit rate for uplink).

Figure 1B:
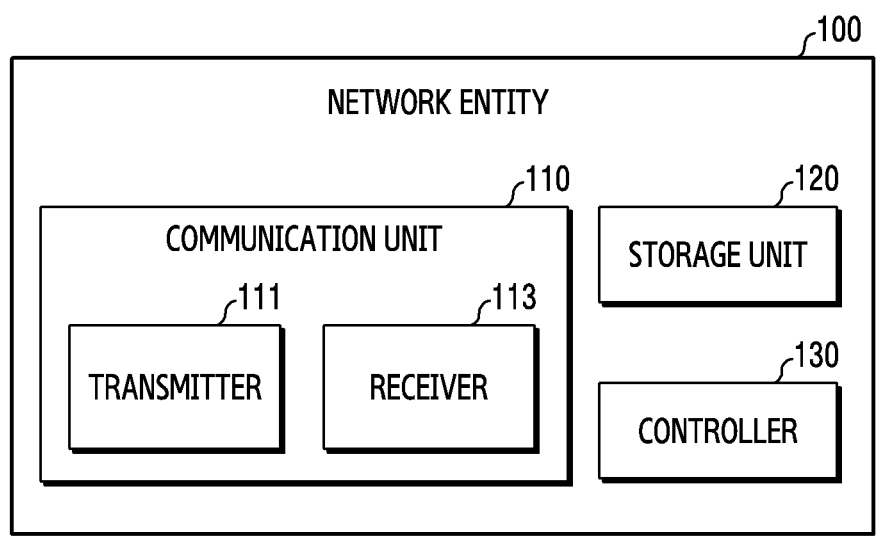
FIG. 1B is a diagram illustrating a configuration of a network entity in a wireless communication system according to an embodiment of the disclosure.

FIG. 1B is a diagram illustrating a configuration of a network entity in a wireless communication system according to an embodiment of the disclosure.

In various embodiments of the disclosure, the network entity is a concept including a network function (NF) according to a system implementation. Terms, such as "~unit" and "~group" used hereinafter refer to a unit that processes at least one function or operation, which may be implemented as hardware or software, or a combination of hardware and software.

Referring to FIG. 1B, the network entity according to various embodiments may include a communication unit 110, a storage unit 120, and a controller 130 that controls overall operations of a network entity 100.

The communication unit 110 transmits and receives signals with other network entities. Accordingly, all or part of the communication unit 110 may be referred to as a transmitter 111, a receiver 113, or at least one transceiver 110.

The storage unit 120 stores data, such as a basic program, an application program, and configuration information for the operation of the network entity 100. The storage unit 120 may include a volatile memory, a nonvolatile memory, or a combination of a volatile memory and a nonvolatile memory. In addition, the storage unit 120 provides stored data according to the request of the controller 130.

The controller 130 controls overall operations of the network entity 100. For example, the controller 130 transmits and receives signals through the communication unit 110. In addition, the controller 130 writes and reads data in the storage unit 120. In addition, the controller 130 may perform functions of a protocol stack required by a communication standard. To this end, the controller 130 may include a circuit, an application-specific circuit, at least one processor, or a micro-processor, or may be a part of a processor. In addition, a part of the communication unit 110 and the controller 130 may be referred to as a communication processor (CP). The controller 130 may control the network entity 100 to perform any one operation of the various embodiments.

The communication unit 110 and the controller 130 are not necessarily implemented as separate modules, but can be implemented as a single component in the form of a single chip or a software block. The communication unit 110, the storage unit 120, and the controller 130 may be electrically connected. In addition, operations of the network entity 100 may be realized by having a storage unit 120 storing a corresponding program code in the network entity 100.

The network entity 100 includes a network node, and the network node may be any one of a base station (RAN), a terminal (UE), NF, AMF, SMF, UPF, NEF, NRF, CF, NSSF, UDM, AF, AUSF, SCP, UDSF, context storage, OAM, EMS, a configuration server, and an ID management server.

The 5G system according to various embodiments may include a terminal, a base station, and a 5G core network. The 5G core network may include network functions (NF), such as AMF, SMF, PCF, UPF, UDM, UDR, NEF, NSSF, NRF, and SCP. According to various embodiments of the disclosure, the network function (NF) may mean a network entity (NE) and a network resource. The next generation-radio access network (NG-RAN, 5G-RAN, RAN) refers to a base station that provides a wireless communication function to a terminal. User equipment (UE) can access the 5G core network through the base station.

Various network functions described below may include one specific physical device or two or more physical devices. In addition, each of the physical devices may include a program or software for executing the methods described below under the control of a processor included therein. In the following description, only the names of the respective NFs are presented for convenience of description, but implemented as a physical device including at least one processor as described above, and it is obvious to those skilled in the art that a program or software for the operation described in the disclosure may be mounted. Therefore, the expression "device" will be omitted below and will be described only with the name of a specific NF.

Embodiment 1

Embodiment 1 describes a method for a mobile communication service provider to operate a network slice.

The mobile communication service provider can define the size of network resources that can be provided for each network slice. In various embodiments of the disclosure, this is referred to as a network slice policy or slice policy. Slice policy information may include the following information.

S-NSSAI
Maximum number of UEs
Maximum number of PDU sessions
Maximum data rates

The S-NSSAI included in slice policy information according to various embodiments is an identifier representing a slice. The mobile communication service provider may use a network slice instance (NSI) identifier (ID) instead of S-NSSAI as an identifier representing such a slice.

The maximum number of terminals included in the slice policy information according to various embodiments may represent the number of terminals permitted to use the S-NSSAI. The terminal may transmit network slice information (requested NSSAI) to be used during the registration procedure (registration procedure or attach procedure) to the AMF, and the AMF may provide the terminal with network slice information (allowed NSSAI) that can be used by the terminal.

The maximum number of terminals may represent a maximum value of the number of terminals that have received an allowed NSSAI including the corresponding S-NSSAI during a registration procedure. For example, if the maximum number of UEs in an eMBB slice is 1 million, the 5G core network may transmit an allowed NSSAI including S-NSSAI indicating the eMBB slice to a maximum of 1 million UEs.

According to various embodiments of the disclosure, the maximum number of sessions included in the slice policy information may indicate the number of sessions (PDU sessions or packet data network (PDN) connections) established using S-NSSAI. In the session establishment procedure (PDU session establishment procedure or PDN connection setup procedure), the terminal may transmit a PDU session establishment request message to the 5G core network, including the slice information to be used (S-NSSAI), and the 5G core network may process the session establishment request from the terminal to establish a session.

The maximum number of sessions may represent the maximum value of a session established with the corresponding S-NSSAI during a session establishment procedure. For example, if the maximum number of sessions in an eMBB slice is 3 million, the 5G core network may allow up to 3 million sessions for the number of sessions established with S-NSSAI, which refers to the eMBB slice.

According to various embodiments of the disclosure, the maximum number of sessions of an eMBB slice may be calculated as the product of the maximum number of terminals (e.g., 1 million sessions) of the eMBB slice and the maximum number of sessions that can be established per each terminal (e.g., 3 sessions). Alternatively, according to various embodiments of the disclosure, the maximum number of sessions that each terminal can establish using an eMBSS slice can be calculated as a value obtained by dividing the maximum number of sessions (e.g., 3 million sessions) of the eMBB slice by the maximum number of terminals (e.g., 1 million terminals) of the eMBB slice.

The maximum data rate/usage included in the slice policy information according to various embodiments may indicate a transmission rate of user plane data transmitted in a session established using S-NSSAI. For example, if the maximum data capacity of an eMBB slice is 3 million Tbytes, the 5G core network can allow up to 3 million terabytes per second (Tbps) of data transmitted in a session established with S-NSSAI, which refers to the eMBB slice.

This slice policy information may be configured in the NF (e.g., AMF, PCF, NSSF, NWDAF, UDM, or the like) of the 5G core network. For example, the mobile communication service provider may configure the slice policy information in the NF of the 5G core network in the form of OAM. Alternatively, the NF of the 5G core network (e.g., AMF, or the like) may obtain the slice policy information from the NF of another 5G core network (e.g., PCF, NSSF, NWDAF, UDM, or the like).

Various methods may be used for the mobile communication service provider to enforce slice policy information.

According to various embodiments of the disclosure, the NF of the 5G core network may reject a subsequent registration request when the number of currently registered terminals of the corresponding S-NSSAI exceeds the maximum number of registered terminals.

According to various embodiments of the disclosure, the NF of the 5G core network may reject a subsequent PDU session establishment request when the number of current establishment sessions of the corresponding S-NSSAI exceeds the maximum number of sessions.

According to various embodiments of the disclosure, the NF of the 5G core network may reject the registration request of the S-NSSAI when the current data rate/usage rate of the S-NSSAI exceeds the maximum data rate/usage rate. Details will be described later in Embodiment 2.

According to various embodiments of the disclosure, the NF of the 5G core network may reject the PDU session request of the S-NSSAI when the current data rate/usage rate of the S-NSSAI exceeds the maximum data rate/usage rate. Details will be described later in Embodiment 3.

According to various embodiments of the disclosure, the NF of the 5G core network can lower the data rate/usage rate of all PDU sessions established with the S-NSSAI when the current data rate/usage rate of the S-NSSAI exceeds the maximum data rate/usage rate. Details will be described later in Embodiment 4 and Embodiment 5.

Figure 2:
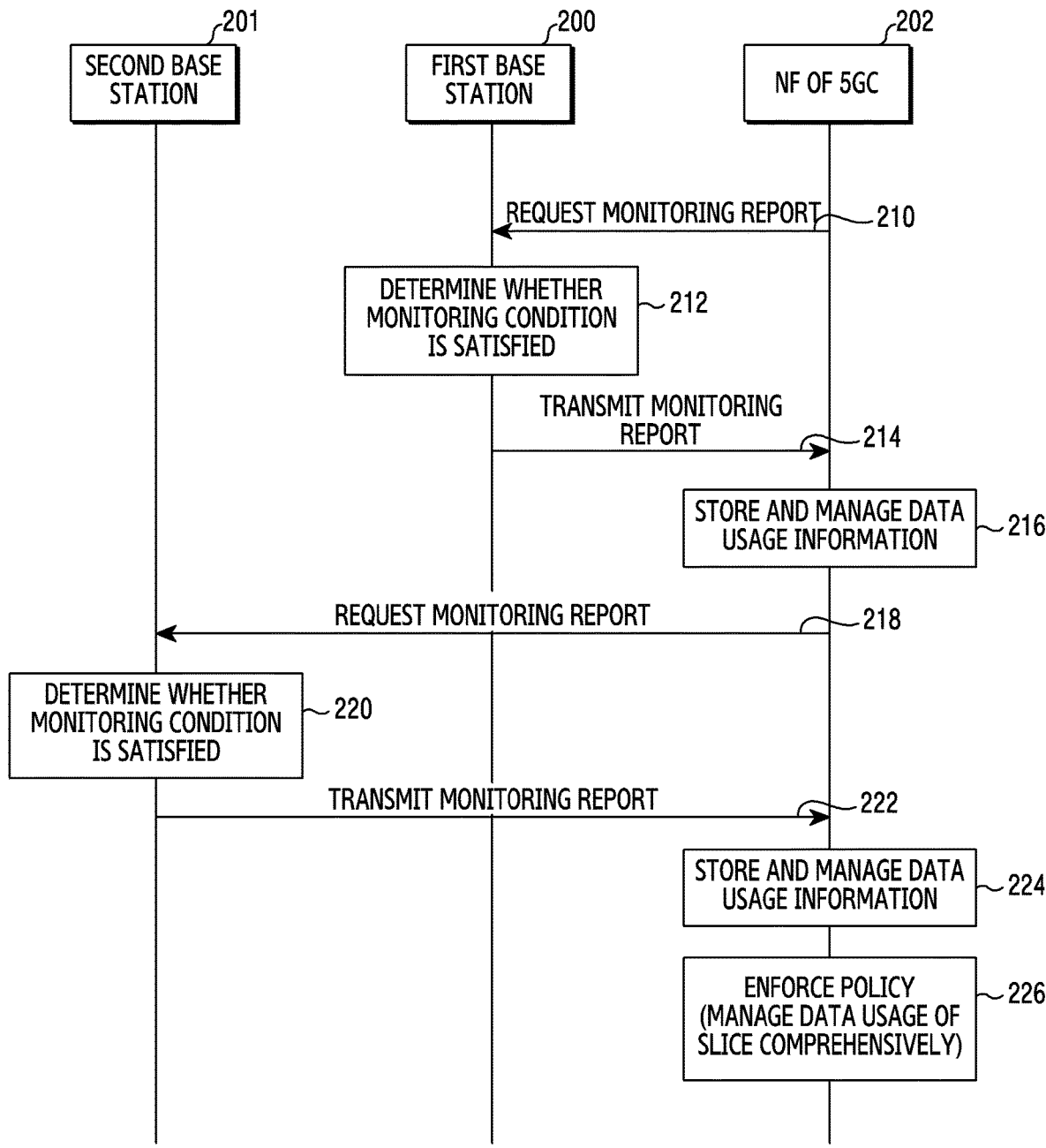
FIG. 2 is a diagram illustrating a procedure of collecting a slice data rate and data usage from a base station in a wireless communication system according to an embodiment of the disclosure.

FIG. 2 is a diagram illustrating a procedure of collecting a slice data rate and data usage from a base station in a wireless communication system according to an embodiment of the disclosure.

Referring to FIG. 2, at operation 210, an NF of the 5G core network 202 (e.g., AMF, SMF, PCF, NSSF, NRF, NWDAF, UDM, or the like) is an NF that manages a slice policy (e.g., data rate/usage rate). The NF 202 manages base station information (e.g., RAN node ID, cell ID, or the like) supporting a slice referred to as a slice ID (S-NSSAI or SST).

At operation 210, the NF 202 may request a slice data rate monitoring report from the base station through the AMF. Alternatively, the NF 202 may be AMF. For example, the NF 202 is an NF that manages the data rate of the eMBB slice (eMBB S-NSSAI or eMBB SST), and the NF 202 knows that a first base station 200 and a second base station 201 support eMBB slices. The NF 202 may transmit a monitoring report request message to the first base station 200 at operation 210. In addition, the NF 210 may transmit a monitoring report request message to the second base station 201 at operation 218.

A slice ID and a slice-related monitoring condition may be included in the monitoring report request message of operations 210 and 218. For example, the monitoring conditions may include time (period) information for transmitting a monitoring report message, data usage information for transmitting a monitoring report message, and event information for transmitting a monitoring report message.

At operation 212, the first base station 200 may store the slice ID and the slice monitoring condition received through the monitoring report request message at operation 210, and determine whether the monitoring condition is satisfied.

For example, when the monitoring condition includes time (period) information (e.g., once every two hours, once a day, 4:00 am, or the like), the first base station 200 may transmit a monitoring report message of operation 214 when the timing or period according to the condition comes.

For example, when the monitoring condition includes data usage information (e.g., 1 terabyte of accumulated data usage, or the like), the first base station 200 may transmit a monitoring report message at operation 214 when the accumulated data usage generated in the network slice referred to as the slice ID reaches the data usage described in the condition.

For example, if the monitoring condition includes event information (e.g., when the requested slice data rate is not satisfied, when the first base station 200 reaches the maximum data rate that can be enforced, or the like), the first base station 200 may transmit the monitoring report message of operation 214 when a corresponding event occurs.

For example, after the first base station 200 receives the monitoring report request message of operation 210, or when the current data usage/transmission amount report indicator is included in the monitoring report request message, the first base station 200 may transmit the monitoring report message at operation 214.

At operation 214, the base station 200 may transmit a monitoring report message to the NF 202. The monitoring report may include a slice ID, accumulated data usage, current data rate, error status, and occurred event information.

At operation 216, the NF 202 stores and manages data usage information for the received slice ID.

In the processes from operations 218 to 224, when one or more base stations support the slice, the NF 202 may perform the processes from operations 210 to 216 with the second base station 201 supporting the slice. Although for the convenience of explanation, message transmission and reception between the NF 202 and the first base station 200 was first described in the process from operations 210 to 216, and message transmission and reception between the NF 202 and the second base station 201 was described later in the process from operations 218 to 224, message transmission and reception between the NF 202 and the first base station 200 and message transmission and reception between the NF 202 and the second base station 201 may occur independently.

At operation 226, the NF 202 may comprehensively manage and monitor the data usage of the slice based on the information collected from the base stations 200 and 201 supporting the slice. In other words, the NF 202 can enforce policy.

For example, the accumulated data usage of the slice managed by the NF 202 may be a sum of the accumulated data usage received from the first base station 200 at operation 214 and the accumulated data usage received from the second base station 201 in operation 222.

Figure 3:
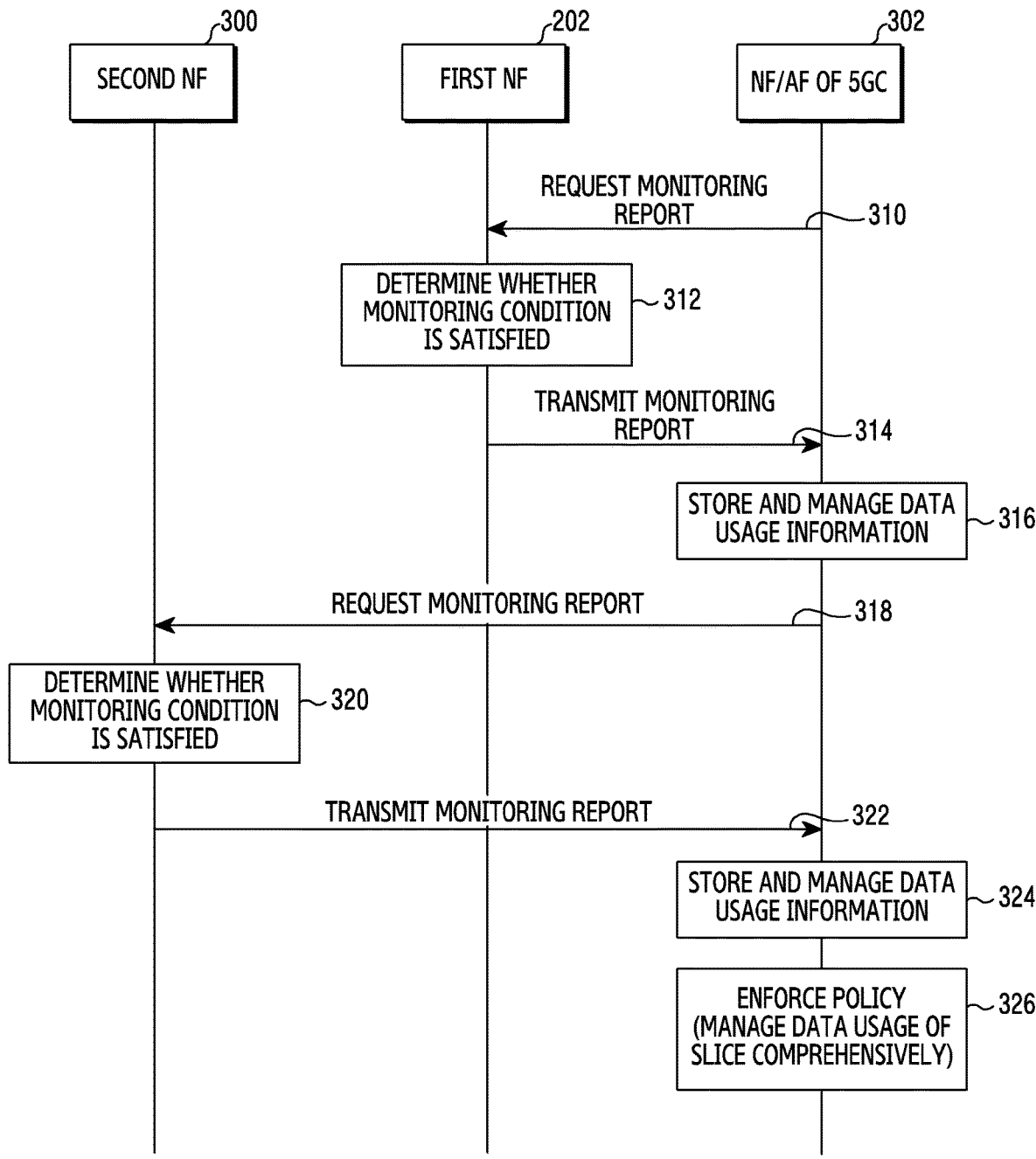
FIG. 3 is a diagram illustrating a procedure of collecting a slice data rate and data usage from a network function (NF)

FIG. 3 is a diagram illustrating a procedure of collecting a slice data rate and data usage from an NF in a wireless communication system according to an embodiment of the disclosure.

Referring to FIG. 3, hereinafter, for the ease of description, a NF 302 is described as an NF of a 5G core network, but according to various embodiments of the disclosure, the NF 302 may be an AF.

At operation 310, the NF 302 (e.g., AMF, SMF, PCF, NSSF, NRF, NWDAF, UDM, or the like) of the 5G core network is an NF that manages a slice policy (e.g., data rate/usage rate). The NF 302 manages NF (NF ID, NF address, or the like) supporting a slice referred to as a slice ID (S-NSSAI or SST).

At operation 310, the NF 302 may request a monitoring report on the data rate of the slice from the NF 202 and 300 (e.g., AMF, SMF, PCF, NRF, or the like) supporting the slice referred to as the corresponding slice ID. For example, the NF 302 is an NF that manages the data rate of an eMBB slice (eMBB S-NSSAI or eMBB SST). The NF 302 knows that the first NF 202 and the second NF 300 support eMBB slices. The NF 302 may transmit a monitoring report request message to the first NF 202 at operation 310. In addition, the NF 302 may transmit a monitoring report request message to the second NF 300 at operation 318.

The first NF 202 and the second NF 300 may manage data usage/transmission rate used in a slice referred to as a slice ID. For example, during the PDU session establishment procedure, the first NF 202 and the second NF 300 may collect data rate information (e.g., aggregate maximum bit rate (AMBR), guaranteed bit rate (GBR) flow data rate, non-GBR flow data rate, or the like) related to the slice. Alternatively, for example, the first NF 202 and the second NF 300 may collect data rate information from the base station through the procedure shown in FIG. 2.

The messages of operations 310 and 318 may include a slice ID and a monitoring condition related to the slice. For example, monitoring conditions may include time (period) information for transmitting a monitoring report message, data usage information for transmitting a monitoring report message, and event information for transmitting a monitoring report message.

At operation 312, the first NF 202 may store the slice ID and the slice monitoring condition received at operation 310, and determine whether the monitoring condition is satisfied.

For example, if the monitoring condition includes time (period) information (e.g., once every 2 hours, once a day, 4 a.m., or the like), the base station may transmit the message of operation 314 when the timing or period according to the condition comes.

For example, when the monitoring condition includes data usage information (e.g., 1 terabyte of accumulated data usage, or the like), the first NF 202 may transmit a monitoring report message of operation 314 when the accumulated data usage generated in the network slice referred to as the slice ID reaches the data usage described in the condition.

For example, if the monitoring condition includes event information (e.g., when the requested slice data rate is not satisfied, the base station reaches the maximum data rate that can be enforced, or the like), the base station may transmit a monitoring report message at operation 314 when a corresponding event occurs.

For example, after the first NF 202 receives the monitoring report request message of operation 310, or when the current data usage/transmission amount report indicator is included in the monitoring report request message, the first NF 202 may transmit the monitoring report message of operation 314.

At operation 314, the first NF 202 transmits a monitoring report message to the NF 302 of the 5G core network. The monitoring report may include a slice ID, accumulated data usage, current data rate, error status, and occurred event information. According to various embodiments of the disclosure, the NF 302 of the 5G core network may be an application function (AF).

At operation 316, the NF 302 stores and manages data usage information for the received slice ID.

In the processes from operations 318 to 324, if one or more NF 202 and/or 300 supports the slice, the NF 302 may perform a second NF 300 supporting slice and a process from operations 310 to 316. Although for the convenience of explanation, message transmission and reception between the NF 302 and the first NF 202 was first described in the process from operations 310 to 316, and message transmission and reception between the NF 302 and the second NF 300 was described later in the process from operations 318 to 324, message transmission/reception between the NF 302 and the first NF 300 and message transmission/reception between the NF 302 and the second NF 301 may occur independently.

At operation 326, the NF 302 may comprehensively manage and monitor the data usage of the slice based on the information collected from the NFs 300 and 202 supporting the slice. For example, the NF 302 may enforce policy.

For example, the accumulated data usage of the slice managed by the NF 302 may be a sum of the accumulated data usage received from the first NF 202 at operation 314 and the accumulated data usage received from the second NF 300 at operation 322.

The NF 300 may enforce a slice policy, based on information collected from other NFs 202 and 300.

FIG. 4 is a diagram illustrating a registration procedure or a PDU session establishment procedure in a wireless communication system according to an embodiment of the disclosure.

Referring to FIG. 4, it illustrates a registration procedure of Embodiment 2 or a PDU session establishment procedure of Embodiment 3.

Embodiment 2

Embodiment 2 describes a method of rejecting the registration request of the S-NSSAI when the current data rate/usage rate of the S-NSSAI exceeds the maximum data rate/usage rate in the 5G core network.

Hereinafter, a registration procedure according to the second embodiment will be described with reference to FIG. 4.

Referring to FIG. 4, an NF 302 of the 5G core network is an NF that manages the slice data rate/use rate. For example, the NF 302 may be NSSF, PCF, UDM, NWDAF, or the like. The AMF 401 is an NF that processes the terminal registration procedure.

Referring to FIG. 4, at operation 410, an AMF 401 may transmit a slice event subscription request message to the NF 302 in order to subscribe to an event related to a slice. The name of the message is exemplary, and various embodiments are not limited to the message name. The slice event subscription request message may include at least one of a slice ID (e.g., S-NSSAI) and an event ID. The NF 302 may store the received slice event subscription request message.

At operation 326, according to the method described in the embodiment of FIG. 3, the NF 302 may manage the data rate/usage rate of the slice associated with the S-NSSAI. The NF 302 may take specific actions while monitoring the current data rate/usage rate. In other words, the NF 202 may enforce policy.

For example, based on the slice policy information stored by the NF 302, the NF 302 may decide not to accept the terminal registration any more when the current data rate/usage rate of the slice exceeds the maximum data rate/usage rate.

For example, the NF 302 is based on the subscription information included in the slice event message received from the AMF 401 at operation 410 stored by the NF 302, and may decide to transmit a notification message to the AMF 401 when the current data rate/usage rate of the slice satisfies the event condition.

At operation 412, the NF 302 may transmit a slice event notification message or a slice policy enforcement request message to the AMF 401. The name of the message is exemplary, and various embodiments are not limited to the message name.

In the slice event notification message or slice policy enforcement request message sent from the NF 302 to the AMF 401, information on at least one of slice ID (e.g., S-NSSAI), current data rate/usage rate related to the slice, event ID, request behavior, and back-off timer information may be included. The event ID may be an indicator indicating which event related to a slice. Further, the event ID may be one of the event IDs received from the AMF 401 at operation 410. The request action may be an action (e.g., terminal registration rejection, or the like) requesting the AMF 401 to perform the NF 302. In addition, the request action may be not included as a separate parameter in the message of operation 412 and be implicitly indicated through the event ID.

The AMF 401 may know the current data rate/usage rate information related to the slice, based on the information received from the NF 302. Further, the AMF 401 may determine a slice-related action (e.g., terminal registration rejection, or the like), based on information received from the NF 302.

At operation 414, the terminal 400 may transmit a registration request message to the AMF 401. The registration request message may include a request slice (requested NSSAI) to be used by the terminal 400. The request slice may include a slice ID (e.g., S-NSSAI) to be used by the terminal 400.

At operation 416, the AMF 401 may know that the data rate/usage rate of the slice (S-NSSAI) requested by the terminal 400 at operation 414 through a registration request message exceeds the maximum data rate/usage rate, based on the information received through the slice event notification message or the slice policy enforcement request message at operation 412. In accordance with the determination that the data rate/usage rate of the requested slice (S-NSSAI) exceeds the maximum data rate/usage rate, the AMF 401 may decide to reject the slice (S-NSSAI) requested by the terminal 400 at operation 414.

The AMF 401 may transmit a registration accept message to the terminal 400. The registration accept message may include information indicating that the S-NSSAI has been rejected (e.g., the rejected S-NSSAI includes the S-NSSAI). The terminal 400 may know that the S-NSSAI requested at operation 414 cannot be used.

Alternatively, the AMF 410 may transmit a registration reject message to the terminal 400. The terminal 400 may know that the registration requested at operation 414 has been rejected according to reception of the registration reject message.

The registration accept message or the registration reject message may include back-off timer information. The terminal 400 may retransmit a registration request message requesting the S-NSSAI after the time indicated by the back-off timer elapses or according to the local policy of the terminal 400.

Embodiment 3

Embodiment 3 describes a method of rejecting a PDU session request from the S-NSSAI when the NF of the 5G core network exceeds the maximum data rate/usage rate of the current data rate/usage rate of the S-NSSAI. According to various embodiments of the disclosure, the AMF or SMF may reject the PDU session request.

Hereinafter, a PDU Session Establishment procedure according to Embodiment 3 will be described with reference to FIG. 4. Specifically, a process in which the AMF 401 rejects the PDU session request will be described with reference to FIG. 4.

Referring to FIG. 4, an NF 302 of the 5G core network is an NF that manages the slice data rate/usage rate. For example, the NF 302 may be NSSF, PCF, UDM, NWDAF, or the like. The AMF 401 is an NF that processes the PDU session establishment procedure.

Referring to FIG. 4, at operation 410, the AMF 401 may transmit a slice event subscription request message to the NF 302 in order to subscribe to an event related to a slice. The name of the message is exemplary, and various embodiments are not limited to the message name. The slice event subscription request message may include at least one of a slice ID (e.g., S-NSSAI) and an event ID. The NF 302 may store the received slice event subscription request message.

At operation 326, according to the method described in the embodiment of FIG. 3, the NF 302 may manage the data rate/usage rate of the slice associated with the S-NSSAI. The NF 302 is currently monitoring the data rate/usage rate and may take specific actions. In other words, the NF 202 may enforce policy.

For example, the NF 302 may decide not to accept PDU session establishment any more when the current data rate/usage rate of the slice exceeds the maximum data rate/use rate, based on the slice policy information stored by the NF 302.

Alternatively, for example, the NF 302 may determine to transmit a notification message to the AMF 401 when the current data rate/usage rate of the slice satisfies the event condition, based on the subscription information included in the slice event message received from the AMF 401 at operation 410 stored by the NF 302.

At operation 412, the NF 302 may transmit a slice event notification message or a slice policy enforcement request message to the AMF 401. The name of the message is exemplary, and various embodiments are not limited to the message name.

The slice event notification message or slice policy enforcement request message sent from the NF 302 to the AMF 401 may include information on at least one of a slice ID (e.g., S-NSSAI), current data rate/usage rate related to the slice, an event ID, a request action, and back-off timer information. The event ID may be an indicator indicating which event related to a slice. Further, the event ID may be one of the event IDs received from the AMF 401 at operation 410. The request action may be an action (e.g., rejection of PDU session establishment, or the like) that the NF 302 requests the AMF 401 to perform. In addition, the request action may not be included as a separate parameter in the message of operation 412 and be implicitly indicated through the event ID.

The AMF 401 may know current data rate/usage rate information related to the slice, based on the information received from the NF 302 through a slice event notification message or a slice policy enforcement request message. In addition, the AMF 401 may determine a slice-related action (e.g., rejection of PDU session establishment), based on the information received from the NF 302.

At operation 414, the terminal 400 may transmit a PDU session establishment request message to the AMF 401. The PDU session establishment request message may include a request slice (S-NSSAI) to be used by the terminal 400. The request slice may include a slice ID (e.g., S-NSSAI) that the UE intends to use.

At operation 416, the AMF 401 may know that that the data rate/usage rate of the slice (S-NSSAI) requested by the terminal 400 at operation 414 through the PDU session establishment request message exceeds the maximum data rate/usage rate, based on the information received through the slice event notification message or the slice policy enforcement request message at operation 412. In accordance with the determination that the data rate/usage rate of the requested slice (S-NSSAI) exceeds the maximum data rate/usage rate, the AMF 401 may decide to reject the slice (S-NSSAI) requested by the terminal 400 at operation 414.

The AMF 401 may transmit a PDU session establishment reject message to the terminal 400. The PDU session establishment reject message may include information indicating that the S-NSSAI has been rejected (e.g., a cause value, an indication).

The terminal 400 may know that the PDU session cannot be established with the S-NSSAI requested at operation 414 according to the reception of the PDU session establishment reject message. The PDU session establishment reject message may include back-off timer information. The terminal 400 may retransmit a PDU session establishment request message requesting the S-NSSAI after the time indicated by the back-off timer elapses or according to the local policy of the terminal 400.

FIG. 5 is a diagram illustrating a PDU session establishment procedure in a wireless communication system according to an embodiment of the disclosure. Specifically, FIG. 5 illustrates a method of rejecting a PDU session request by the SMF.

Referring to FIG. 5, an NF 302 of the 5G core network is an NF that manages slice data rate/usage rate. For example, the NF 302 may be NSSF, PCF, UDM, NWDAF, or the like. The SMF 501 is an NF for managing sessions.

Referring to FIG. 5, at operation 510, the SMF 501 may transmit a slice event subscription request message to the NF 302 in order to subscribe to an event related to a slice. The name of the message is exemplary, and various embodiments are not limited to the message name. The slice event subscription request message may include at least one of a slice ID (e.g., S-NSSAI) and an event ID. The NF 302 may store the received slice event subscription request message.

At operation 326, according to the method described in the embodiment of FIG. 3, the NF 302 may manage the data rate/usage rate of the slice related to S-NSSAI. The NF 302 may be currently monitoring the data rate/usage rate and can take specific actions. In other words, the NF 202 may enforce policy.

For example, the NF 302 may decide not to accept PDU session establishment any more when the current data rate/usage rate of the slice exceeds the maximum data rate/usage rate, based on the slice policy information stored by the NF 302.

Alternatively, for example, the NF 302 may determine to transmit a notification message to the SMF 501 when the current data rate/use rate of the slice satisfies the event condition, based on the subscription information included in the slice event message received from the SMF 501 at operation 510 stored by the NF 302.

At operation 512, the NF 302 may transmit a slice event notification message or a slice policy enforcement request message to the SMF 501. The name of the message is exemplary, and various embodiments are not limited to the message name.

The slice event notification message or slice policy enforcement request message sent from the NF 302 to the SMF 501 may include information on at least one of a slice ID (e.g., S-NSSAI), current data related to the slice rate/usage rate, an event ID, a request action, and back-off timer information. The event ID may be an indicator indicating which event related to a slice. In addition, the event ID may be one of the event IDs received from the SMF 501 at operation 510. The request action may be an action (e.g., rejection of PDU session establishment, or the like) that the NF 302 requests the SMF 501 to perform. In addition, the request action may not be included as a separate parameter in the message of operation 512, and be implicitly indicated through the event ID.

The SMF 501 may know current data rate/usage rate information related to the slice, based on the information received from the NF 302 through a slice event notification message or a slice policy enforcement request message. In addition, the SMF 501 may determine a slice-related action (e.g., rejection of PDU session establishment), based on information received from the NF 302.

At operation 514, the terminal 400 may transmit a PDU session establishment request message to the AMF 401. The PDU session establishment request message may include a request slice (S-NSSAI) to be used by the terminal 400. The request slice may include a slice ID (e.g., S-NSSAI) that the UE intends to use.

At operation 516, the AMF 410 may transmit a Nsmf_PDUSession_CreateSMContext request message to the SMF 501 to deliver a PDU session establishment request message received from the terminal 400 to the SMF 501.

At operation 518, the SMF 501 may know that the data rate/usage rate of the slice (S-NSSAI) requested by the terminal 400, received at operation 516, exceeds the maximum data rate/usage rate, based on the information received through the slice event notification message or the slice policy enforcement request message at operation 512. Accordingly, the SMF 501 may determine to reject the slice (S-NSSAI) requested by the terminal 400 received at operation 516.

The SMF 501 may transmit a PDU session establishment reject message to the terminal 400 through the AMF 401. The PDU session establishment reject message may be included in the Nsmf_PDUSession_CreateSMContext Response message transmitted from the SMF 501 to the AMF 401. The PDU session establishment reject message may include information indicating that the S-NSSAI has been rejected (e.g., cause value, indication). The PDU session establishment reject message may include back-off timer information.

At operation 520, the AMF 401 may transmit a PDU session establishment reject message received from the SMF 501 to the terminal 400. The terminal 400 may know that the PDU session with the S-NSSAI requested at operation 414 cannot be established. The terminal 400 may retransmit a PDU session establishment request message requesting the S-NSSAI after the time indicated by the back-off timer elapses or according to the local policy of the terminal 400.

Embodiment 4

In Embodiment 4, a method of calculating a data rate is described in order to lower the data rate/usage rate of all PDU sessions established by the NF of the 5G core network through the corresponding S-NSSAI, when the current data rate/usage rate of the S-NSSAI exceeds the maximum data rate/usage rate.

According to various embodiments of the disclosure, the NF of the 5G core network may lower the data rate/usage rate of all PDU sessions established by the corresponding S-NSSAI, when the current data rate/usage rate of the S-NSSAI exceeds the maximum data rate/usage rate. To this end, the NF can calculate the data rate/usage rate of the PDU session in various ways as follows.

The NF according to various embodiments may lower the data rate/usage rate currently being used by each PDU session by using a percentage. For example, the NF may decide to lower the data rate/usage rate currently being used to a specific value (e.g., 20%) according to an operator policy. According to this method, the PDU session using the 100 millions of bits per second (Mbps) data rate/usage rate and the PDU session using the 50 Mbps data rate/usage rate using S-NSSAI may reduce the data rate/usage rate to 80 Mbps and 40 Mbps, respectively.

The NF according to various embodiments may lower the data rate/usage rate currently being used by each PDU session by using a data usage rate (bit per second, bps). For example, the NF may decide to reduce the currently used data rate/usage rate to a specific value (e.g., 20 Mbps) according to an operator policy. According to this method, the PDU session using the 100 Mbps data rate/usage rate and the PDU session using the 50 Mbps data rate/usage rate using S-NSSAI may reduce the data rate/usage rate to 80 Mbps and 30 Mbps, respectively.

The NF according to various embodiments may lower the data rate/usage rate currently being used by all PDU sessions using a percentage. For example, the NF may decide to reduce the total data rate/usage rate currently being used to a specific value (e.g., 20%) according to an operator policy. According to this method, if the total data rate/usage rate of all PDU sessions using S-NSSAI is 1 million Tbps, it may be decided to reduce the total data rate/usage rate of all PDU sessions to 20%, that is, to 800,000 Tbps. Accordingly, the NF may determine a value obtained by dividing the total data rate/usage rate (e.g., 800,000 Tbps) of all reduced PDU sessions by the number of total PDU sessions as the data rate/usage rate available to each PDU session. The NF may know the entire PDU session, based on information received from other NFs (e.g., AMF, SMF, or the like).

The NF according to various embodiments may lower a data rate/usage rate currently being used by all PDU sessions by using a data usage rate (bit per second). For example, the NF may decide to reduce the total data rate/usage rate currently being used to a specific value (e.g., 100,000 Tbps) according to an operator policy. According to this method, if the sum of the total data rate/usage rate of all PDU sessions using S-NSSAI is 1 million Tbps, it may be determined to reduce the total data rate/usage rate of all PDU sessions to a value excluding a specific value (e.g., 100,000 Tbps), that is, to 900,000 Tbps. Accordingly, the NF may determine a value obtained by dividing the total data rate/usage rate of all reduced PDU sessions (e.g., 900,000 Tbps) by the number of all PDU sessions, as the data rate/usage rate available to each PDU session. The NF may know the entire PDU session, based on information received from other NFs (e.g., AMF, SMF, or the like).

According to various embodiments of the disclosure, the data rate of the session determined by the NF by the method described in the fourth embodiment may include both data transmitted on guaranteed bitrate (GBR) quality of service (QoS) flow(s) and data transmitted on non-GBR QoS flow(s).

For example, the data rate of the slice may include guaranteed bit rate (GBR) for GBR QoS flow(s), guaranteed flow bit rate (GFBR), maximum bit rate (MBR), or maximum flow bit rate (MFBR). Further, the data rate of the slice may include an aggregate maximum bit rate (AMBR) for non-GBR QoS flow(s). The GBR or GFBR or MBR or MFBR or AMBR may be a value defined for a session or a value defined for a slice.

Alternatively, for example, the data rate of the slice may include one total maximum bit rate (TMBR) including both the data rate for GBR QoS flow(s) and the data rate for non-GBR QoS flow(s) without distinguishing the data rate for GBR QoS flow(s) and the data rate for non-GBR QoS flow(s).

Accordingly, the total slice data rate determined by the NF may include both data transmitted on GBR QoS flow(s) and data transmitted on non-GBR QoS flow(s). The NF may use a value excluding the data rate transmitted on the GBR QoS flow(s) among the total slice data rate as the data rate transmitted on the non-GBR QoS flow(s). For example, when the total slice data rate is 5000 Mbps and the data rate transmitted on the GBR QoS flow(s) is 3500 Mbps, the data rate transmitted on the non-GBR QoS flow(s) may be configured as 1500 Mbps. The NF enforces 3500 Mbps with the data rate limit of GBR QoS flow(s) among the received/determined slice data rate of 5000 Mbps, and enforces the remaining 1500 Mbps with the data rate limit of non-GBR QoS flow(s).

If it is necessary to reduce the total slice data rate, the NF may preferentially reduce the data rate transmitted on the non-GBR QoS flow(s). For example, when it is necessary to reduce the total slice data rate of 5000 Mbps to 4000 Mbps, the NF may not change the data rate of 3500 Mbps transmitted on the GBR QoS flow(s), and change the data rate transmitted on the non-GBR QoS flow(s) from 1500 Mbps to 500 Mbps. The NF enforces 3500 Mbps with the data rate limit of the GBR QoS flow(s) (GBR QoS flow(s)) among the received/determined slice data rate 4000 Mbps, and enforces the remaining 500 Mbps by limiting the data rate of the non-GBR QoS flow(s).

According to various embodiments of the disclosure, the data rate of the slice determined by the NF by the method described in the fourth embodiment may not include data transmitted on the GBR QoS flow(s), but include only data transmitted on non-GBR QoS flow(s).

For example, the data rate of the slice determined by the NF may include GBR, GFBR, MBR, or MFBR for GBR QoS flow(s). In addition, the data rate of the slice may include AMBR for non-GBR QoS flow(s). The GBR, GFBR, MBR, MFBR, or AMBR may be a value defined for a session or a value defined for a slice.

Alternatively, for example, the data rate of the slice determined by the NF may include one total maximum bit rate (TMBR) including both the data rate for GBR QoS flow(s) and the data rate for non-GBR QoS flow(s), without distinguishing the data rate for GBR QoS flow(s) and the data rate for non-GBR QoS flow(s).

Accordingly, the NF may use the data rate based on only data transmitted on non-GBR QoS flow(s), which is a data rate excluding the data rate transmitted on the GBR QoS flow(s) from the slice data rate including data transmitted on the GBR QoS flow(s) and data transmitted on the non-GBR QoS flow(s).

To this end, when the total slice data rate is 5000 Mbps, and the data rate transmitted on the GBR QoS flow(s) is 3500 Mbps, the NF may configure the data rate transmitted on the non-GBR QoS flow(s) as 1500 Mbps. In this case, the slice data rate determined by the NF by the method described in Embodiment 4 may be 1500 Mbps. The NF enforces the received/determined 1500 Mbps to limit the data rate of the non-GBR QoS flow(s).

If it is necessary to reduce the total slice data rate, the NF may preferentially reduce the data rate transmitted on the non-GBR QoS flow(s). For example, when it is necessary to reduce the total slice data rate of 5000 Mbps to 4000 Mbps, the NF may change the data rate transmitted on the non-GBR QoS flow(s) from 1500 Mbps to 500 Mbps without changing the data rate of 3500 Mbps transmitted on the GBR QoS flow(s). In this case, the NF may use the changed data rate value, that is, 500 Mbps. The NF enforces the received/determined 500 Mbps to limit the data rate of the non-GBR QoS flow(s).

Embodiment 5

In Embodiment 5, when the current data rate/usage rate of the S-NSSAI exceeds the maximum data rate/use rate, a method of lowering the data rate/usage rate of all PDU sessions established by the NF of the 5G core network with the corresponding S-NSSAI will be described.

FIG. 6 is a diagram illustrating a PDU session modification procedure in a wireless communication system according to an embodiment of the disclosure.

Referring to FIG. 6, at operation 610, a terminal 400 may establish a PDU session using the S-NSSAI, and transmit and receive data using the PDU session.

At operation 326, an NF 302 may determine that the maximum data rate/usage rate of the S-NSSAI has been exceeded through the method described in the embodiment of FIG. 3. The NF 302 may determine to lower the data rate of all PDU sessions established using the S-NSSAI, based on an operator policy or a slice policy. In other words, the NF 202 can enforce policy. The NF 302 may determine the data rate of the PDU session established using the S-NSSAI through the method described in Embodiment 4. The data rate (hereinafter referred to as "new slice data rate") of the PDU session determined by the NF 302 at operation 326 may be a value lower than the data rate that the PDU session is currently using (hereinafter, referred to as "old slice data rate").

According to various embodiments of the disclosure, one of operations 612a, 612b, or 612c may be performed.

Operation 612a consists of operations 612a-1 and 612a-2. At operation 612a-1, the NF 302 may transmit a slice event notification or a slice policy enforcement request message to a PCF 600. The name of the message is exemplary, and various embodiments are not limited to the message name. In the slice event notification or slice policy enforcement request message at operation 612a-1, information on at least one of the S-NSSAI and the new slice data rate of the PDU session associated with the S-NSSAI determined by the NF 302 at operation 326 may be included.

At operation 612a-2, the PCF 600 may determine that QoS modification of the PDU session associated with the S-NSSAI is required, based on the information received from the NF 302. The PCF 600 may perform a SM policy association modification (session management (SM) policy association modification) procedure with an SMF 501 that manages the PDU session associated with the S-NSSAI. Through the SM policy association modification procedure, the PCF 600 may transmit a new slice data rate of the PDU session associated with the S-NSSAI to the SMF 501.

When the SMF 501 manages one or more PDU sessions associated with the S-NSSAI, the PCF 600 may perform a single SM policy association modification procedure with the SMF 501, and the SMF 501 apply a new slice data rate acquired in the SM policy association modification procedure to all PDU sessions associated with the S-NSSAI.

Alternatively, when the SMF 501 is managing one or more PDU sessions linked to the S-NSSAI, the PCF 600 may perform the SM policy association modification procedure as many as the number of PDU sessions with the SMF 501, and the SMF 501 may apply a new slice data rate acquired in the SM policy association modification procedure to each PDU session associated with the S-NSSAI.

At operation 612b, the NF 302 may transmit a slice event notification message or a slice policy enforcement request message to the SMF 501 managing the PDU session associated with the S-NSSAI. The name of the message is exemplary, and various embodiments are not limited to the message name. In the slice event notification message or slice policy enforcement request message at operation 612b, information on at least one of the new slice data rate of the PDU session associated with the S-NSSAI determined by the NF 302 at operation 326 of the S-NSSAI may be included.

When the SMF 501 manages one or more PDU sessions linked to the S-NSSAI, the NF 302 may transmit a single message to the SMF 501, and the SMF 501 may apply a new slice data rate obtained from the NF 302 to all PDU sessions associated with the S-NSSAI.

Alternatively, when the SMF 501 is managing one or more PDU sessions associated with the S-NSSAI, the NF 302 may transmit as many messages as the number of PDU sessions to the SMF 501, and the SMF 501 may apply a new slice data rate obtained from the NF 302 to each PDU session associated with the S-NSSAI.

At operation 612c, the UDM may determine that QoS modification of the PDU session associated with the S-NSSAI is required. The UDM may transmit a Nudm_SDM_Notification message to the SMF 500 that manages the PDU session associated with the S-NSSAI. The Nudm_SDM_Notification message may include a new slice data rate of the PDU session associated with the S-NSSAI.

When the SMF 501 manages one or more PDU sessions linked to the S-NSSAI, the UDM can transmit one message to the SMF 501, and the SMF 501 may apply a new slice data rate obtained from UDM to all PDU sessions associated with the S-NSSAI.

Alternatively, when the SMF 501 is managing one or more PDU sessions associated with the S-NSSAI, the UDM may transmit a message as many as the number of PDU sessions to the SMF 501, and the SMF 501 may apply a new slice data rate obtained from UDM to each PDU session associated with the S-NSSAI.

In determining that the UDM needs to modify the QoS of the PDU session associated with the S-NSSAI at operation 612*c*, the UDM may be based on information received from the NF 302. The UDM may receive a new slice data rate of the PDU session associated with the S-NSSAI determined by the NF 302 from the NF 302.

At operation 614, the SMF 501 may determine that the QoS update of the PDU session associated with the S-NSSAI is required, based on the information received at operation 612*a* (operations 612*a*-1 and 612*a*-2), operation 612*b*, or operation 612*c*.

The SMF 501 may determine the coverage range of the QoS update (e.g., an uplink data rate and a downlink data rate), based on at least one of operator policy, local policy, subscription information obtained from UDM, policy information obtained from PCF, and information received from NF 302.

For example, when QoS update is applied to the downlink data rate, operations 616, 618, 620, 622, and 624 may be omitted. In this case, the new slice data rate may be delivered up to the UPF. Alternatively, when the QoS update is applied to the downlink data rate, operation 620 may be omitted. In this case, the new slice data rate may be transmitted to the UPF and the base station.

For example, when applying the QoS update to the uplink data rate, operations 626 and 628 may be omitted. In this case, a new slice data rate may be transmitted to the terminal and the base station. Alternatively, when the QoS update is applied to the uplink data rate, operations 620, 626 and 628 may be omitted. In this case, the new slice data rate may be transmitted to the base station. Alternatively, when the QoS update is applied to the uplink data rate, all procedures of FIG. 6 may be performed. In this case, the new slice data rate may be transmitted to the terminal, the base station, and the UPF.

At operation 616, the SMF 501 may transmit a Namf_Communication_N1N2MessageTransfer message or an Nsmf_PDUSession_SMContextStatusNotify message to the AMF 401. The name of the message is exemplary, and various embodiments are not limited to the message name. In the message of operation 616, S-NSSAI, PDU session ID(s), SM context ID(s), bulk request indicator, and data rate (new slice data rate) may be included.

The PDU session ID may include IDs of all PDU sessions established through the AMF 401 in association with the S-NSSAI. The SM context ID may include an SM context ID associated with all PDU sessions established through the AMF 401 in association with the S-NSSAI. In this case, the SMF 501 may transmit one message to the AMF 401 to update the data rate of all PDU sessions associated with the S-NSSAI.

The PDU session ID may include one PDU session ID established through the AMF 401 in association with the S-NSSAI. The SM context ID may include one SM context ID established through the AMF 401 in association with the S-NSSAI. In this case, the SMF 501 may transmit a message as many as the number of PDU sessions to the AMF 401 to update the data rate of each PDU session associated with the S-NSSAI.

If the message at operation 616 does not contain a PDU session ID or SM context ID, the AMF 401 may apply the received data rate to all PDU sessions associated with the S-NSSAI.

The AMF 401 may apply the received data rate to one PDU session associated with the S-NSSAI or to all PDU sessions associated with the S-NSSAI. For example, the AMF 401 may determine the data rate coverage range (e.g., one PDU session or all PDU sessions) according to the message received at operation 616 (e.g., message name, message type, or the like). Alternatively, for example, when the message of operation 616 includes a bulk request indicator, or when the message of operation 616 does not include a PDU session ID or SM context ID, the AMF 401 may apply the received data rate to all PDU sessions associated with the S-NSSAI.

At operation 618, the AMF 401 may transmit an N2 session request message to the base station 500. The name of the message is exemplary, and various embodiments are not limited to the message name. The message of operation 618 may include at least one of S-NSSAI, PDU session ID(s), bulk request indicator, and new slice data rate.

The PDU session ID(s) may include IDs of all PDU sessions established through the base station 500 in association with the S-NSSAI. In this case, the AMF 401 may transmit one message to the base station 500 to update the data rate of all PDU sessions associated with the S-NSSAI.

The PDU session ID(s) may include one PDU session ID established through the base station 500 in association with the S-NSSAI. In this case, the AMF 401 may transmit a message as many as the number of PDU sessions to the base station 500 to update the data rate of each PDU session associated with the S-NSSAI.

When the PDU session ID(s) is not included in the message of operation 618, the base station 500 may apply the received data rate to all PDU sessions associated with the S-NSSAI.

When a bulk request indicator is included in the message of operation 618, the base station 500 may apply the received data rate to all PDU sessions associated with the S-NSSAI.

The base station 500 may adjust the uplink data rate and/or downlink data rate of the PDU session, data bearer, or QoS flow associated with the S-NSSAI, based on the received information.

At operation 620, the base station 500 may perform an AN-specific resource modification procedure with the terminal 400. During an AN-specific resource modification (access node (AN)-specific resource modification) procedure, the base station 500 may transmit a PDU session modification command message to the terminal 400. The PDU session modification command message may include at least one of S-NSSAI, PDU session ID, and new slice data rate.

The terminal 400 may adjust the uplink data rate of the PDU session associated with the S-NSSAI based on the received information.

At operation 622, the base station 500 may transmit an N2 session response message to the AMF 401.

At operation 624, the AMF 401 may transmit an Nsmf_PDUSession_UpdateSMContext request (Nsmf_PDUSession_UpdateSMContext request) message to the SMF 501. Upon receiving the Nsmf_PDUSession_UpdateSMContext request (Nsmf_PDUSession_UpdateSMContext request)

message at operation 624, the SMF 501 may know that the base station and/or the terminal adjusted the data rate of the PDU session associated with the S-NSSAI.

At operation 626, the SMF 501 may transmit an N4 session modification request message to the UPF 502 that is providing a PDU session associated with the S-NSSAI. The name of the message is exemplary, and various embodiments of the disclosure are not limited to the message name. In the N4 session modification request message at operation 626, information on at least one of S-NSSAI, PDU session ID(s), N4 session ID(s), bulk request indicator, and new slice data rate may be included.

The PDU session ID may include IDs of all PDU sessions established through the UPF 502 in association with the S-NSSAI. The N4 session ID may include an N4 session ID associated with all PDU sessions established through the UPF 502 in association with the S-NSSAI. In this case, the SMF 501 may transmit one message to the UPF 502 to update the data rate of all PDU sessions associated with the S-NSSAI.

The PDU session ID may include one PDU session ID established through the UPF 502 in association with the S-NSSAI. The N4 session ID may include one SM context ID established through the UPF 502 in association with the S-NSSAI. In this case, the SMF 501 may transmit a message equal to the number of PDU sessions or N4 sessions to the UPF 502 to update the data rate of each PDU session associated with the S-NSSAI.

When the PDU session ID or the N4 session ID is not included in the message of operation 626, the UPF 502 may apply the received data rate to all PDU sessions associated with the S-NSSAI.

When a bulk request indicator is included in the message of operation 626, the UPF 502 may apply the received data rate to all PDU sessions associated with the S-NSSAI.

At operation 628, the UPF 502 may adjust the downlink data rate and/or uplink data rate of the PDU session associated with the S-NSSAI based on the received information. After adjusting the downlink data rate and/or uplink data rate of the PDU session associated with S-NSSAI, the UPF 502 may transmit an N4 session modification response message to the SMF 501.

When there are a plurality of UPFs providing PDU sessions linked to the S-NSSAI, the SMF 501 may perform operation 626 or operation 628 with each UPF.

FIG. 7 is a flowchart illustrating an operation process of a network function in a wireless communication system according to an embodiment of the disclosure.

Referring to FIG. 7, the NF 302 is an NF that manages a slice data rate/usage rate. For example, the NF 302 may be NSSF, PCF, UDM, NWDAF, or the like.

At operation 701, the NF 302 may obtain slice policy information. For example, the NF 302 may receive slice policy information configuration through operations, administration and maintenance (OAM). Alternatively, the NF 302 may receive slice policy information from another NF or AF. The slice policy information may include maximum data rate information.

At operation 702, the NF 302 may monitor the current data rate of the PDU session associated with the slice. For example, the NF 302 may receive the current data rate of the PDU session associated with the slice from a base station or another NF.

At operation 703, the NF 302 may compare the sum of the maximum data rate included in the slice policy information and the data rate used in all PDU sessions associated with the slice. Specifically, the NF 302 may determine whether the sum of the data rates being used in the PDU session associated with the slice exceeds the maximum data rate.

If the sum of the data rates being used in all PDU sessions associated with the slice exceeds the maximum data rate included in the slice policy information, the NF 302 may perform operation 704.

If the sum of the data rates being used in all PDU sessions associated with the slice does not exceed the maximum data rate included in the slice policy information, the NF 302 may perform operation 702.

At operation 704, the NF 302 may calculate a data rate that can be used by the PDU session associated with the slice.

At operation 705, the NF 302 may transmit a data rate that can be used by the PDU session associated with the slice calculated by the NF 302 to another NF.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in nonvolatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks, such as the Internet, Intranet, local area network (LAN), wireless LAN (WLAN), and storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for operating a policy control function (PCF) in a wireless communication system, the method comprising:
  obtaining network slice related policy information including a maximum data rate for a network slice of a single-network slice selection assistance information (S-NSSAI), wherein the maximum data rate includes a maximum bit rate (MBR) of guaranteed bitrate (GBR) Quality of Service (QOS) flows and an aggregate maximum bit rate (AMBR) of non-guaranteed bitrate (non-GBR) QoS flows;
  monitoring a data rate associated with the network slice;
  determining whether the data rate associated with the network slice exceeds the maximum data rate;
  reducing the AMBR of the non-GBR QoS flows not to exceed the maximum data rate in case that it is determined that the data rate associated with the network slice exceeds the maximum data rate, to control the data rate associated with the network slice; and
  transmitting, to a session management function (SMF), a policy update request message including the reduced AMBR.

2. The method of claim 1, wherein the transmitting of the policy update request message comprises:
  in case that it is determined that the data rate associated with the network slice exceeds the maximum data rate, transmitting, to the SMF, the policy update request message including the data rate associated with the network slice.

3. The method of claim 1,
  wherein the transmitting of the policy update request message comprises:
    transmitting, to the SMF, the policy update request message indicating a rejection of an establishment of a protocol data unit (PDU) session associated with the network slice, and
  wherein the policy update request message indicates the S-NSSAI of the network slice.

4. The method of claim 1, wherein the data rate associated with the network slice is a sum of data rates of all protocol data unit (PDU) sessions associated with the network slice.

5. The method of claim 3, wherein the policy update request message includes a cause value or an indication associated with the rejection of the establishment of the PDU session associated with the network slice.

6. The method of claim 1,
  wherein the transmitting of the policy update request message comprises:
    transmitting, to the SMF, the policy update request message indicating a rejection of a registration of a user equipment which requested the network slice, and
  wherein the policy update request message indicates the S-NSSAI of the network slice.

7. An apparatus of a policy control function (PCF) in a wireless communication system, the apparatus of the PCF comprising:
  a transceiver; and
  at least one processor configured to:
    obtain network slice related policy information including a maximum data rate for a network slice of a single-network slice selection assistance information (S-NSSAI), wherein the maximum data rate includes a maximum bit rate (MBR) of guaranteed bitrate (GBR) Quality of Service (QOS) flows and an aggregate maximum bit rate (AMBR) of non-guaranteed bitrate (non-GBR) QOS flows,
    monitor a data rate associated with the network slice,
    determine whether the data rate associated with the network slice exceeds the maximum data rate,
    reducing the AMBR of the non-GBR QoS flows not to exceed the maximum data rate, in case that it is determined that the data rate associated with the network slice exceeds the maximum data rate, to control the data rate associated with the network slice, and
    transmit, to a session management function (SMF), a policy update request message including the reduced AMBR.

8. The apparatus of the PCF of claim 7, wherein, to transmit the policy update request message, the at least one processor is further configured to:
  in case that it is determined that the data rate associated with the network slice exceeds the maximum data rate, transmit, to the SMF, the policy update request message including the data rate associated with the network slice.

9. The apparatus of the PCF of claim 7,
  wherein, to transmit the policy update request message, the at least one processor is further configured to:
    transmit, to the SMF, the policy update request message indicating a rejection of an establishment of a protocol data unit (PDU) session associated with the network slice, and
  wherein the policy update request message indicates the S-NSSAI of the network slice.

10. The apparatus of the PCF of claim 7, wherein the data rate associated with the network slice is a sum of data rates of all protocol data unit (PDU) sessions associated with the network slice.

11. The apparatus of the PCF of claim 9, wherein the policy update request message includes a cause value or an indication associated with the rejection of the establishment of the PDU session associated with the network slice.

12. The apparatus of the PCF of claim 7,
  wherein, to transmit the policy update request message, the at least one processor is further configured to:
    transmit, to the SMF, the policy update request message indicating a rejection of a registration of a user equipment which requested the network slice, and
  wherein the policy update request message indicates the S-NSSAI of the network slice.

* * * * *